(12) United States Patent
Komori et al.

(10) Patent No.: US 8,252,082 B2
(45) Date of Patent: Aug. 28, 2012

(54) FILTER DEVICE IN PARTICULAR FOR AN EXHAUST SYSTEM OF AN INTERNAL COMBUSTION ENGINE

(75) Inventors: Teruo Komori, Stuttgart (DE); Christian Schiller, Stuttgart (DE); Lars Thuener, Royal Oak, MI (US); Dominik Huelsmeier, Stuttgart (DE); Tobias Hoeffken, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 587 days.

(21) Appl. No.: 12/300,609

(22) PCT Filed: Mar. 26, 2007

(86) PCT No.: PCT/EP2007/052847
§ 371 (c)(1),
(2), (4) Date: Apr. 28, 2009

(87) PCT Pub. No.: WO2007/134897
PCT Pub. Date: Nov. 29, 2007

(65) Prior Publication Data
US 2009/0205301 A1    Aug. 20, 2009

(30) Foreign Application Priority Data
May 23, 2006 (DE) .......................... 10 2006 024 076
Jun. 6, 2006 (DE) .......................... 10 2006 026 161

(51) Int. Cl.
*B01D 39/06* (2006.01)

(52) U.S. Cl. .................................... 55/523; 55/DIG. 30

(58) Field of Classification Search ............ 55/522–524; 422/169–172, 177–182; 60/297
See application file for complete search history.

(56) References Cited

U.S. PATENT DOCUMENTS

| | | | | |
|---|---|---|---|---|
| 4,276,071 A * | 6/1981 | Outland | .......................... | 55/523 |
| 4,364,761 A * | 12/1982 | Berg et al. | ........................ | 55/523 |
| 4,415,344 A * | 11/1983 | Frost et al. | ....................... | 55/523 |
| 4,416,676 A | 11/1983 | Montierth | | |
| 4,417,908 A * | 11/1983 | Pitcher, Jr. | ....................... | 55/523 |
| D519,197 S * | 4/2006 | Komori et al. | ............... | D23/365 |
| 7,208,214 B2 * | 4/2007 | Ichikawa | ....................... | 428/116 |
| 2004/0161373 A1 * | 8/2004 | Ichikawa et al. | .............. | 422/180 |
| 2004/0170803 A1 * | 9/2004 | Ichikawa | ....................... | 428/116 |
| 2004/0261384 A1 * | 12/2004 | Merkel et al. | ................... | 55/523 |
| 2005/0076627 A1 * | 4/2005 | Itou et al. | ......................... | 55/523 |

(Continued)

FOREIGN PATENT DOCUMENTS
DE      198 20 971      11/1999

(Continued)

OTHER PUBLICATIONS

International Search Report, PCT International Patent Application No. PCT/EP2007/052847, dated Jul. 7, 2007.

*Primary Examiner* — Duane Smith
*Assistant Examiner* — Amber Orlando
(74) *Attorney, Agent, or Firm* — Kenyon & Kenyon LLP

(57) ABSTRACT

Cross-sectional geometries of filter elements for soot particle filters are described, allowing uniform loading of the filter element with soot. Starting with hexagonal cell shapes, other polygonal shapes are arranged around them. All the cross-sectional geometries have in common the fact that the cross-sectional area of all inlet channels is larger than the cross-sectional area of all outlet channels.

49 Claims, 5 Drawing Sheets

U.S. PATENT DOCUMENTS

| | | | |
|---|---|---|---|
| 2006/0021309 A1* | 2/2006 | Merkel | 55/523 |
| 2006/0057046 A1* | 3/2006 | Punke et al. | 423/215.5 |
| 2006/0191248 A1* | 8/2006 | Bardhan et al. | 55/523 |
| 2007/0114700 A1* | 5/2007 | Andrewlavage et al. | 264/400 |
| 2008/0124517 A1* | 5/2008 | Beall et al. | 428/118 |
| 2010/0269697 A1* | 10/2010 | Vincent et al. | 95/273 |

FOREIGN PATENT DOCUMENTS

| | | |
|---|---|---|
| EP | 0089751 | 9/1983 |
| EP | 1502640 | 2/2005 |
| JP | 58-196820 | 11/1983 |
| JP | 10-15323 | 1/1998 |
| JP | 2002-10 | 4/2002 |
| JP | 2002-514707 | 5/2002 |
| JP | 2006-35224 | 2/2006 |
| WO | WO 2005/068396 | 7/2005 |
| WO | WO 2005/115589 | 12/2005 |
| WO | WO 2006/025283 | 3/2006 |

\* cited by examiner

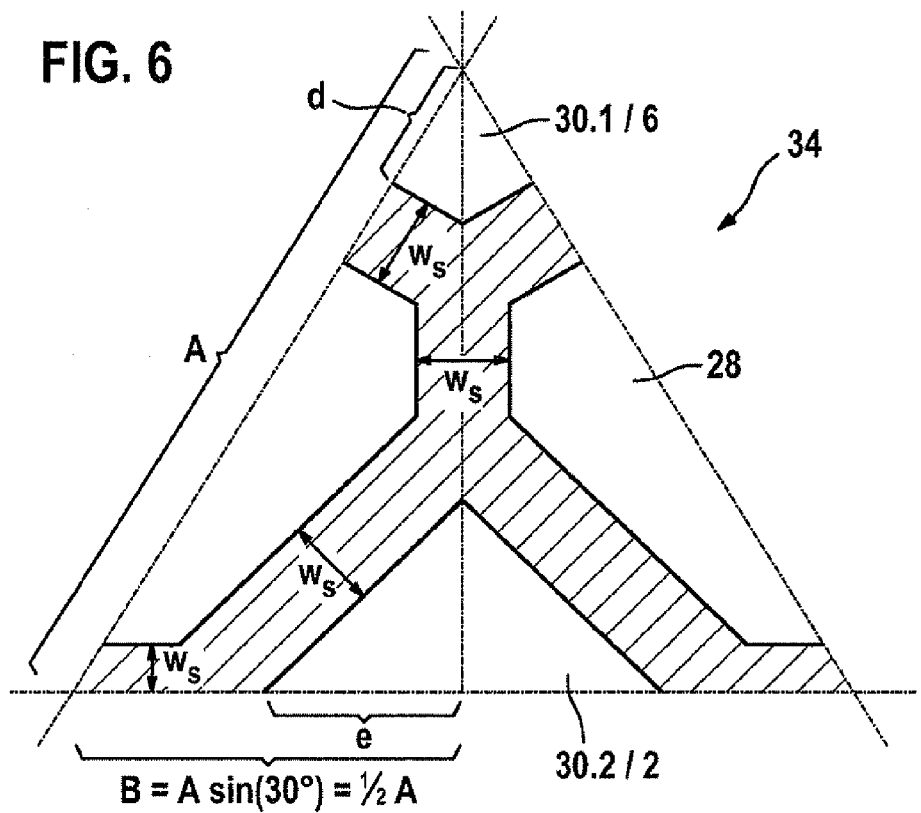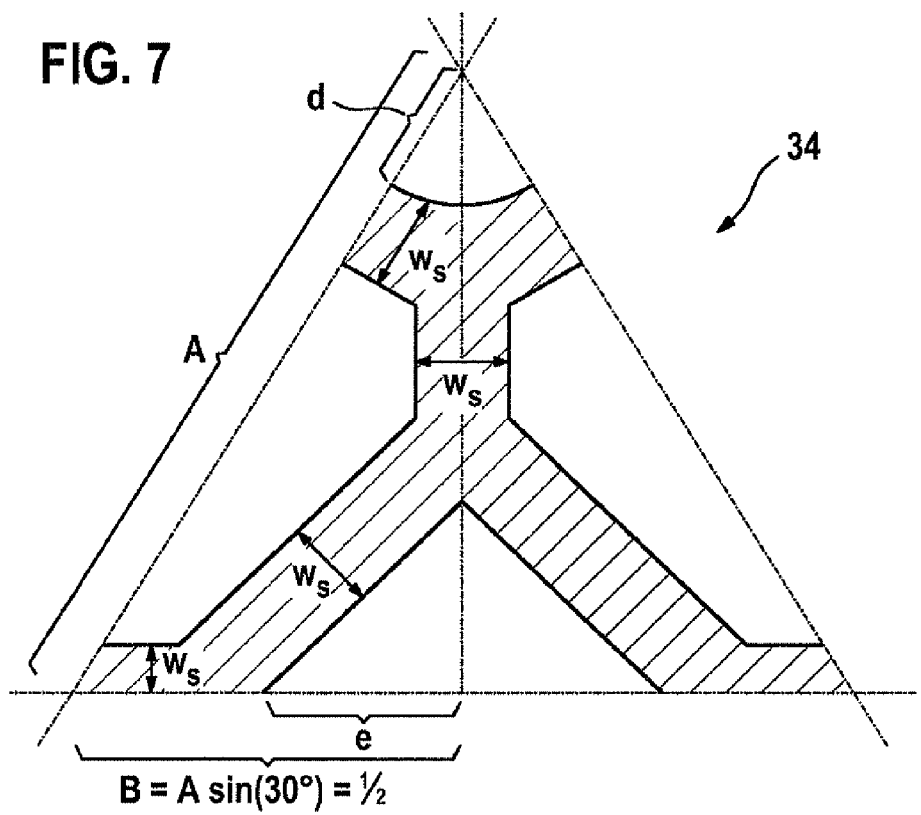

FILTER DEVICE IN PARTICULAR FOR AN EXHAUST SYSTEM OF AN INTERNAL COMBUSTION ENGINE

FIELD OF THE INVENTION

The present invention relates to a filter element, in particular for an exhaust system of an internal combustion engine, as well as a soot filter having a filter element.

BACKGROUND INFORMATION

European Patent No. EP 1 502 640 A1 describes a filter element having an inlet area and an outlet area, and a plurality of inlet channels and a plurality of outlet channels, the inlet channels having a hexagonal cross section and the outlet channels having a square or rhomboid cross section, and the inlet channels and outlet channels being separated by a filter wall made of an open-pored material.

Filter elements are often made of a ceramic material and are usually manufactured by extrusion. This means that the filter element blank is a prismatic body having a plurality of channels running in parallel. The channels of a blank are initially open at both ends.

To allow the exhaust gas that is to be cleaned to flow through the walls of the filter, some of the channels are sealed at the rear end of the filter element, while other channels are sealed at the front end of the filter element. This forms two groups of channels, namely so-called inlet channels, which are closed at the rear end, and so-called outlet channels, which are closed at the beginning of the filter element.

There is a flow connection between the inlet channels and the outlet channels exclusively through the porous walls of the filter element (hereinafter: filter walls) so the exhaust gas is only able to flow through the filter element by flowing out of the inlet channels and into the outlet channels through the walls of the filter element.

With the conventional filter element, soot particles become deposited on the upstream surface of the filter wall over a period of time, These soot particles cause a reduction in permeability of the filter wall and consequently cause an increase in the pressure drop which occurs in passage of the gas flow through the filter wall. Accordingly, the so-called "exhaust backpressure" increases. If it exceeds a certain value, the filter is regenerated by burning off the deposited soot particles. Heat is released in this process, resulting in an increase in temperature in the filter element.

The larger the filter area of the honeycomb body, the longer the regeneration intervals may be. Honeycomb bodies with a high cell density, i.e., with small channel diameters, have a high volume-specific filter area. However, the channels on the inlet side must not be too small because otherwise there is the risk of blockage of the channels due to ash or soot particles. Furthermore, if the pressure drop caused by the flow through the filter channels is too great in relation to the total pressure drop of the filter, there is the risk of uneven loading. This is a disadvantage in particular when this high ratio is caused by the channels on the outgoing flow end of the filter because in this case the flow passes through the filter wall in the rear area of the filter, where a greater amount of soot is deposited. During regeneration, the highest temperatures occur in this part of the filter anyway. This effect is further potentiated by a large amount of deposited soot. In the case of filter elements made of cordierite, this risk is particularly great because cordierite has a comparatively low specific thermal capacity and therefore very high temperatures may occur locally during oxidation of soot deposits. Consequently, under unfavorable circumstances during regeneration, such high temperatures may occur within the filter element that the thermal stability of the cordierite is no longer ensured. This relationship has so far prevented the use of cordierite filter elements in passenger vehicles.

SUMMARY

An object of the present invention is to increase the uptake capacity of the filter element for soot and ash and thereby prolong the intervals between regeneration. In addition, unacceptably high temperatures should be prevented from occurring in the area of the outlet area of the filter element during regeneration, possibly resulting in destruction of the filter element.

According to an example embodiment of the present invention, with a filter element, in particular for filtering exhaust gas from a diesel internal combustion engine, having an inlet area and an outlet area, and a plurality of inlet channels and a plurality of outlet channels, the inlet channels and the outlet channels being separated by filter walls made of an open-pored material, this object may be achieved by the fact that the cross-sectional area of all inlet channels is greater than the cross-sectional area of all outlet channels and the number of inlet channels is greater than the number of outlet channels.

In addition, the object may be achieved by the fact that the cross-sectional area of all inlet channels is greater than the cross-sectional area of all outlet channels and a roundness parameter of the cross section of the inlet channels is smaller than a roundness parameter of the cross-sectional area of the outlet channels.

The example embodiments of the present invention for achieving this object ensure that the pressure drops in the inlet channels relative to the total pressure drop are approximately equal to the pressure drops of the outlet channels relative to the total pressure drop, and at the same time the surface area of the inlet channels is greater than the surface area of the outlet channels. This results in uniform loading of the filter element with soot. Consequently, the heating of the filter element caused by the burning of soot during regeneration is uniform and there are no local temperature peaks that could cause the destruction of the filter element.

The approaches according to the present invention for achieving this object may of course also be combined because their effects are additive in an advantageous manner.

In an advantageous embodiment of the present invention, the cross section of the filter element is composed of multiple hexagonal unit cells, each unit cell being composed of six triangles in mirror symmetry, three filter walls being provided in each of these triangles, running orthogonally to one side of the triangle. The point of intersection of the filter walls is inside the triangle.

Alternatively, it is also possible for the cross section of the filter element to be formed by joining multiple hexagonal unit cells, for a central outlet channel to be situated at the midpoint of each unit cell, for the central outlet channel to be surrounded by six inlet channels and for the inlet channels to have the cross-sectional shape of a regular hexagon having first sides and second sides, the first sides and the second sides alternating.

This reduces the roundness parameter of the inlet channels, which has a positive effect on the distribution of the pressure drops within the filter element on the inlet channels, the filter walls and the outlet channels.

This effect may be achieved by the fact that the cross section of the filter element is formed by joining a plurality of hexagonal unit cells, a central outlet channel is situated at the midpoint of each unit cell, the central outlet channel is surrounded by six inlet channels, the inlet channels have the cross-sectional shape of a heptagon in mirror symmetry and each of the four adjacent inlet channels surrounds an outer outlet channel. This outer outlet channel preferably has the cross-sectional shape of a square or a rhombus.

Additional advantages and advantageous embodiments of the present invention may be derived from the figures and the description below. All of the features revealed in the figures, and the description thereof may be provided either individually or in any combination with one another.

BRIEF DESCRIPTION OF EXAMPLE EMBODIMENTS

FIGS. 3 through 7 show cross sections of exemplary embodiments of filter elements according to the present invention.

DETAILED DESCRIPTION OF EXAMPLE EMBODIMENTS

Figure 1:
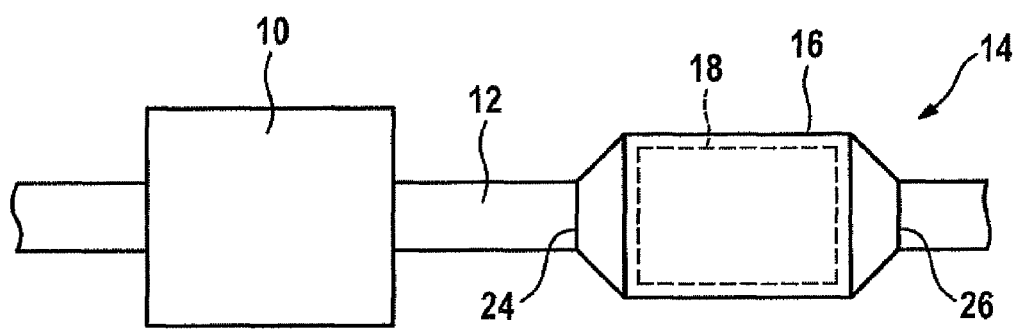
FIG. 1 shows a schematic diagram of an internal combustion engine having an exhaust gas aftertreatment device according to an example embodiment of the present invention.

FIG. 1 shows an internal combustion engine labeled with reference numeral 10. The exhaust gas is removed through an exhaust pipe 12 in which a filter device 14 is situated. Soot particles from the exhaust flowing through exhaust pipe 12 are filtered out with this filter device. This may be required in particular for diesel internal combustion engines to meet statutory requirements.

Filter device 14 includes a cylindrical housing 16 in which a filter element 18 is situated, being rotationally symmetrical and also cylindrical on the whole in the present exemplary embodiment.

Figure 2:
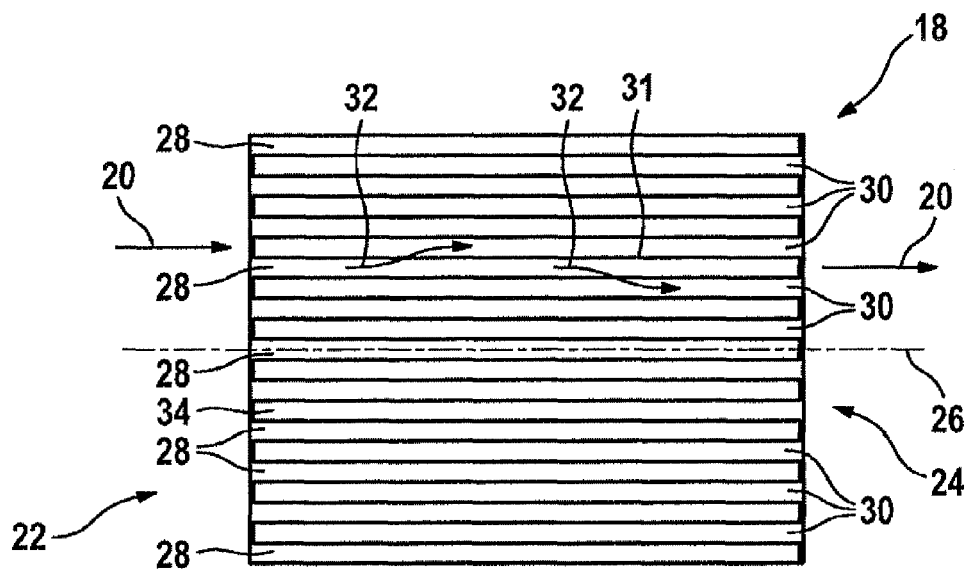
FIG. 2 shows a filter element according to an example embodiment of the present invention in a longitudinal section.

FIG. 2 shows a cross section of a filter element 18 according to an example embodiment of the present invention. The filter element 18 may be manufactured as an extruded molded body of a ceramic material, e.g., cordierite, for example.

Exhaust gas (not shown) flows through filter element 18 in the direction of arrows 20. In FIG. 2 an inlet area is labeled with reference numeral 22 while an outlet area in FIG. 2 has reference numeral 24.

In parallel with a longitudinal axis 26 of filter element 18, multiple inlet channels 28 run in alternation with outlet channels 30. Inlet channels 28 are closed at the outlet area 24. The closing stoppers are depicted in FIG. 2 without a reference numeral. In contrast with that, outlet channels 30 are open in outlet area 24 and are closed in the vicinity of inlet area 22.

The flow path of the uncleaned exhaust gas thus leads into one of inlet channels 28 and from there through a filter wall 31 into one of outlet channels 30. This is represented by arrows 32 as an example.

Filter element 18 is a prismatic body whose cross section is made up of a regularly repeating sequence of inlet channels and outlet channels. This regularly repeating sequence of inlet channels and outlet channels may in many cases be created by reflection, rotation and/or translation of a so-called unit cell. In other words, the entire cross-sectional geometry of the filter element may be made up of multiple unit cells. In the exemplary embodiments shown in FIGS. 3 and 4, the unit cells are hexagonal. The unit cells may also be quadratic, rectangular or rhomboid, for example. However, the present invention is not limited to cross-sectional geometries that may be traced back to unit cells.

The fluidic relationships within a filter element are derived and described below. The area of a unit cell is given as $A_{EZ}$. The number of inlet channels and outlet channels in this unit cell is given as $n_{in}$ and $n_{out}$.

The proportion of filter volume that applies to the inlet channels is identified below as X. In addition, the proportion of filter volume, the part that applies to the filter material, is identified as $\phi$. These components X and $\phi$ have the same values in the entire filter element as in a unit cell, because the filter element is composed of multiple unit cells.

The definitive diameter for the flow resistance of a flow-through channel is a so-called hydraulic diameter $d_h$:

$$d_h = \frac{4A}{U} \quad (1)$$

Hydraulic diameter $d_h$ depends on cross-sectional area A and the circumference U of the channel.

For the hydraulic diameter of inlet channels 28, it holds that:

$$d_{h,in} = \frac{4\chi A_{EZ}}{n_{in} U_{in}} \quad (2)$$

For the hydraulic diameter of outlet channels 30, it holds that:

$$d_{h,out} = \frac{4(1-\varphi-\chi)A_{EZ}}{n_{out} U_{out}} \quad (3)$$

Volume-specific filtration area A''' of a filter element 18 of length L, disregarding the filter length lost due to the stoppers, is given as:

$$A''' = \frac{L n_{in} U_{in}}{L A_{EZ}} = \frac{n_{in} U_{in}}{A_{EZ}} \quad (4)$$

Inserting the channel circumference from equation (2) yields:

$$A''' = \frac{4\chi}{d_{h,in}} \quad (5)$$

As equation (5) shows, a large portion X of inlet channels 28 relative to the total volume of filter element 18 and small channel diameters result in a large volume-specific filter area A'''.

Whereas the size of the channels is appropriately described by hydraulic diameter $d_h$, the shape of the channels is described by roundness parameter f:

$$f = \frac{4\pi A}{U^2} \quad (6)$$

f becomes 1 for round channels, but the value of f declines as channel shapes increasingly deviate from roundness.

Use of the equations (2) and (3) and the definition of roundness from equation (6) result in the following expressions for hydraulic diameter:

$$d_{h,in} = \sqrt{\frac{4}{\pi} f_{in} \chi \frac{A_{EZ}}{n_{in}}} \quad (7)$$

$$d_{h,out} = \sqrt{\frac{4}{\pi} f_{out} (1-\varphi-\chi) \frac{A_{EZ}}{n_{out}}} \quad (8)$$

Inserting these into equation (5) yields:

$$A''' = \sqrt{\frac{4\pi \chi n_{in}}{f_{in} A_{EZ}}} \quad (9)$$

The pressure drop caused by the flow through the channels is estimated as follows:

$$\Delta p_{in} = \frac{1}{3} F \mu L \frac{\dot{V}}{Q} \frac{1}{d_{h,in}^2 \chi} \quad (10)$$

$$\Delta p_{out} = \frac{1}{3} F \mu L \frac{\dot{V}}{Q} \frac{1}{d_{h,out}^2 (1-\varphi-\chi)} \quad (11)$$

where F denotes an empirical dimensionless factor, $\mu$ is the dynamic viscosity of the exhaust gas, $\dot{V}$ is the exhaust volume flow and Q is the cross-sectional area of filter element 18. When the pressure drop components from the two equations are related, the volume ratio of inlet channel 28 and outlet channel 30 is obtained as follows using the variables $R_V = \chi/(1-\varphi-\chi)$:

$$\frac{\Delta p_{in}}{\Delta p_{out}} = \frac{(1-\chi-\varphi)^2}{\chi^2} \frac{n_{in}}{n_{out}} \frac{f_{out}}{f_{in}} = \frac{1}{R_V^2} \frac{n_{in}}{n_{out}} \frac{f_{out}}{f_{in}} \quad (12)$$

These relationships yield the advantageous effects of the cross-sectional geometries according to example embodiments of the present invention. In particular, this means that filter elements 18 having a large number of cells/channels in relation to the cross-sectional area with a volume ratio $R_V$ of inlet channels 28 and outlet channels 30 of $R_V > 1$ and in which no increased soot deposits occur in the downstream area of the inlet channels are feasible only when the honeycomb body has more inlet channels than outlet channels ($n_{in} > n_{out}$) and/or roundness $f_{in}$ of inlet channels 28 is less than roundness $f_{out}$ of outlet channels 30 ($f_{in} < f_{out}$).

Figure 3:
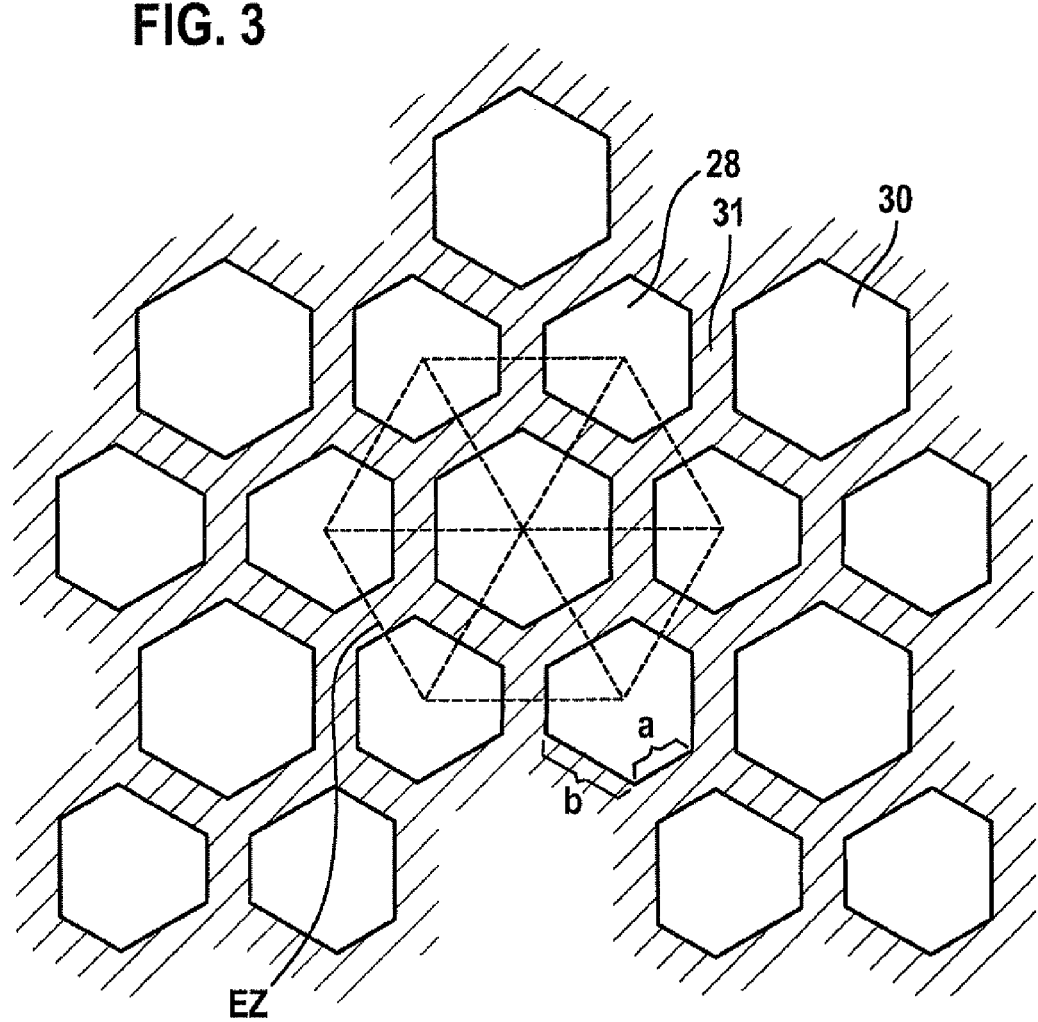

FIG. 3 shows a detail of a cross section of an exemplary embodiment of a filter element 18 according to the present invention on a greatly enlarged scale. The cross section of filter element 18 is composed of an outlet channel 30 having the shape of an equilateral hexagon in cross section and a total of six inlet channels 28 surrounding outlet channel 30. For reasons of simplicity, not all inlet channels 28 and not all outlet channels 30 are labeled with reference numerals.

Inlet channels 28 also have a hexagonal cross section but all six sides of this hexagon are not of equal length. Instead there are first sides a and second sides b which alternate. Due to the different lengths of side a and side b of inlet channels 28, roundness parameter $f_{in}$ of inlet channels 28 is reduced in comparison with roundness parameter $f_{out}$ of outlet channels 30. As a result, the surface area in inlet channels 28 is greater than the surface area of outlet channels 30, resulting in the desired uniform soot loading of filter element 18.

In the exemplary embodiment according to FIG. 3, the ratio between number $n_{in}$ of inlet channels 28 and number $n_{out}$ of outlet channels 30 is equal to 2:1. Since there are more inlet channels 28 than outlet channels 30, uniform loading of filter element 18 with soot is promoted.

The cross section of filter element 18 according to FIG. 3 may also be imagined by combining multiple hexagonal unit cells EZ. These hexagonal unit cells EZ are in turn composed of a total of six triangles 34 in mirror symmetry.

Figure 4:
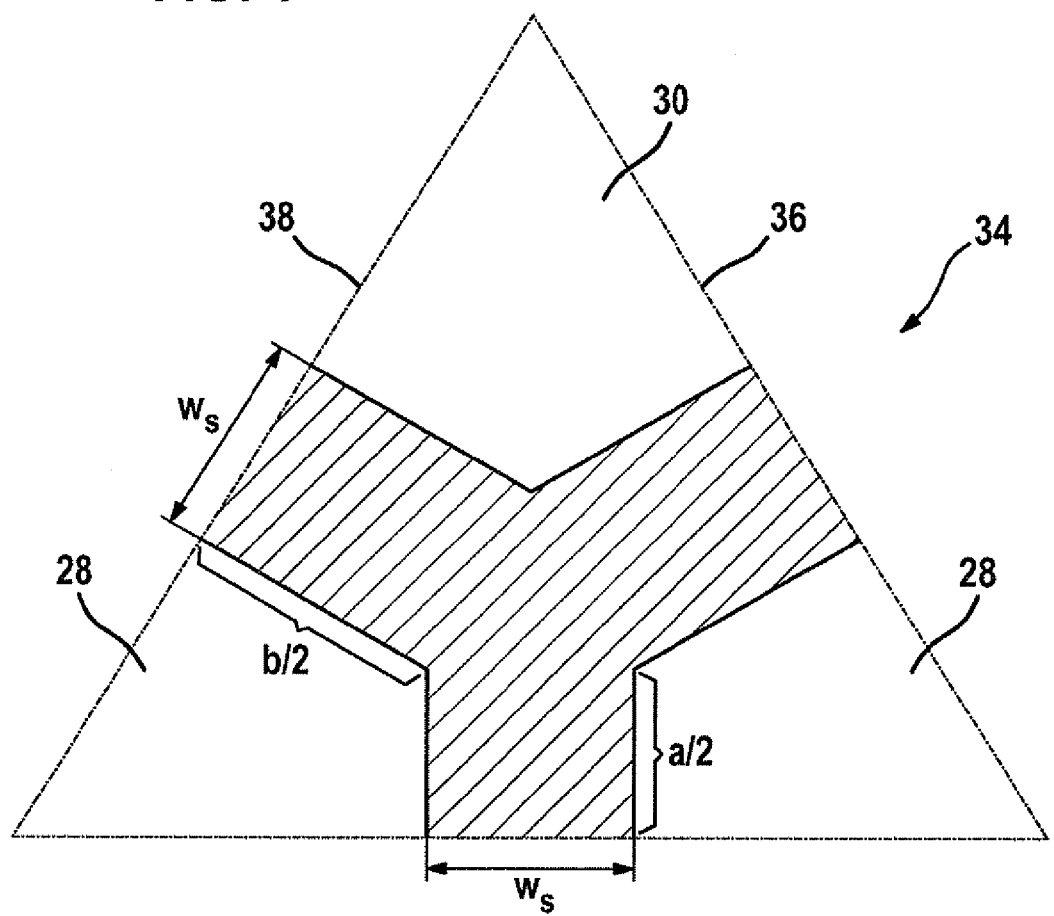

FIG. 4 illustrates such a triangle 34. The more important geometric quantities, namely lengths a and b and wall thickness $w_s$, are entered into FIG. 4. Unit cell EZ is formed by multiple mirroring of triangle 34 around sides 36 and/or 38.

TABLE 1

Preferred ranges for the geometric parameters in FIG. 4.

| Parameter [unit] | Minimum (ideal) | Maximum (ideal) |
|---|---|---|
| a [mm] | 0.4 (0.53) | 1.2 (0.59) |
| $w_s$ [mm] | 0.2 (0.3) | 0.6 (0.45) |
| Ratio a:b [ ] | 0.3 (0.6) | 1.5 (0.75) |

Figure 5:
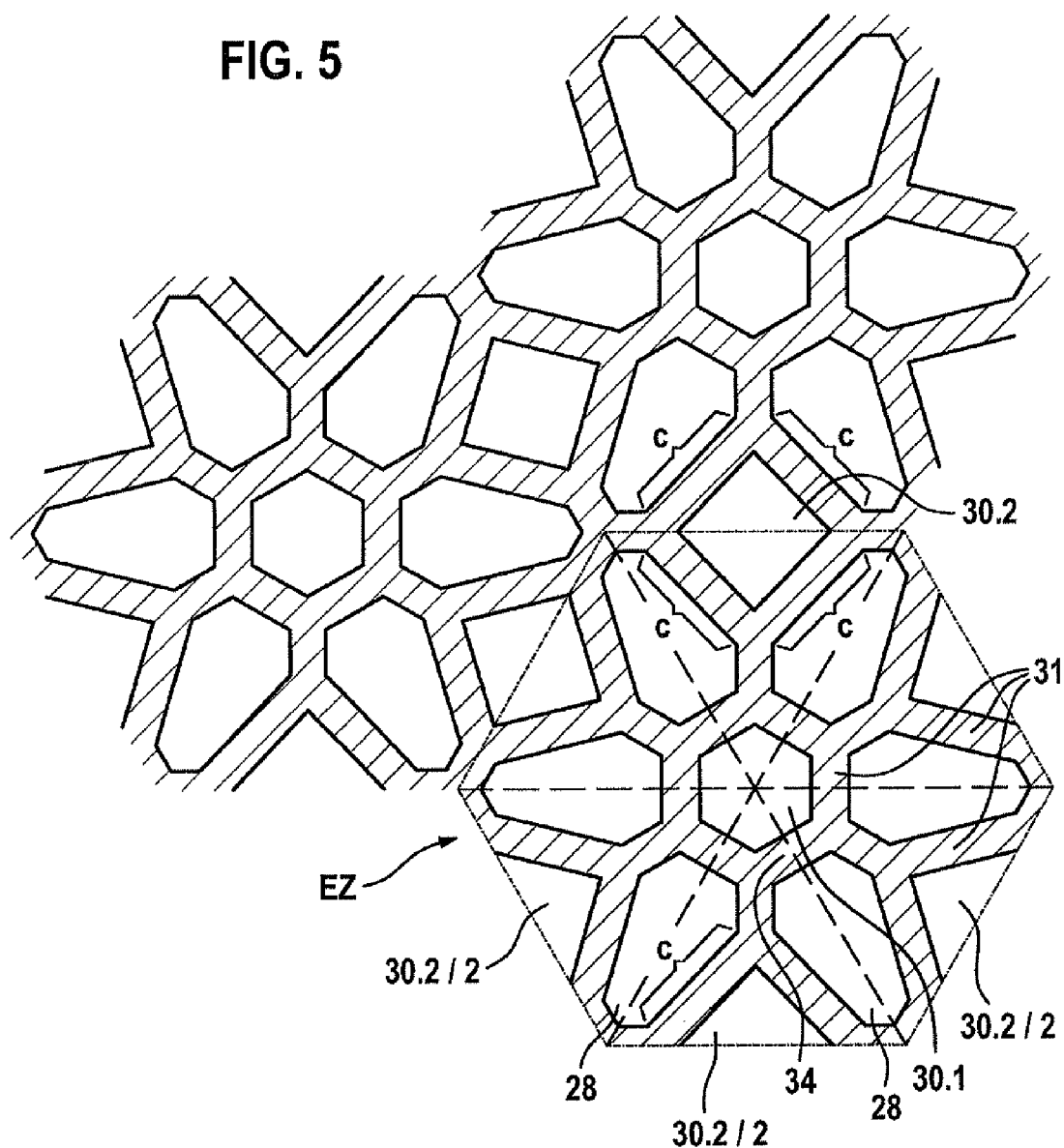

FIG. 5 shows another exemplary embodiment of a filter element according to the present invention in cross section. In FIG. 5 a total of three unit cells EZ have been joined together. It is self-evident that by joining additional unit cells EZ, filter element cross sections of any size may be implemented. At the center of unit cell EZ there is a central outlet channel 30.1, which in the exemplary embodiment according to FIG. 5 has a regular hexagonal shape in cross section.

A total of six inlet channels 28 are situated around central outlet channel 30.1. These inlet channels 28, not all of which have been labeled with reference numerals, are in the form of a heptagon in mirror symmetry in cross section.

The longest sides of the heptagon are labeled with letter c in FIG. 5. Four inlet channels 28 surround with their sides c an outer outlet channel 30.2. These outer outlet channels 30.2 extend over two unit cells EZ. In the unit cell EZ represented by a dash-dot line in FIG. 5, only half of an outer outlet channel 30.2 is depicted on the sides of the unit cell where no additional unit cell is connected. This situation is represented by reference numeral 30.2/2.

FIGS. 6 and 7 show triangles 34, which form unit cells EZ according to FIG. 5. The most important geometric parameters, namely side lengths A, B, d and e, are entered here. It has proven to be advantageous if these parameters are within the value ranges entered in the following table.

TABLE 2

Preferred ranges for the geometric parameters in FIGS. 6 and 7.

| Parameter [unit] | Minimum (ideal) | Maximum (ideal) |
|---|---|---|
| A [mm] | 2.4 (2.7) | 4 (3.1) |
| $w_s$ [mm] | 0.2 (0.33) | 0.6 (0.44) |
| β [°] | 30 (40) | 60 (50) |
| Ratio d:A [ ] | 0.1 (0.17) | 0.3 (0.25) |
| Ratio e:B [ ] | 0.4 (0.5) | 0.7 (0.6) |

In the exemplary embodiment according to FIG. 7, central outlet channel 30.1 has a circular cross section. Otherwise, the cross-sectional geometry is the same as that in the exemplary embodiment according to FIG. 6.

It is self-evident that filter walls 31 must not have sharp-edged transitions, but instead the transition from one filter wall 31 to another filter wall 31 may be designed with a radius (not shown) as needed. These radii facilitate the manufacturing and reduce stress peaks in the area of the transitions from one filter wall 31 to another filter wall 31. Furthermore, it is also possible for filter walls 31 to be curved rather than straight in cross section.

In many applications, it may be advantageous if at least the upstream surface of filter wall 31 has a catalytic coating.

What is claimed is:

1. A filter element for filtering exhaust gases from a diesel internal combustion engine, comprising:
    an inlet area and an outlet area;
    a plurality of inlet channels;
    a plurality of outlet channels, the inlet channels and the outlet channels being separated by filter walls made of an open-pored material;
    wherein a cross-sectional area of all the inlet channels is larger than a cross-sectional area of all the outlet channels, a number of inlet channels is greater than a number of outlet channels, and a roundness parameter $f_{in}$ of the cross section of all the inlet channels is smaller than a roundness parameter $f_{out}$ of the cross section of all the outlet channels, roundness parameter f being defined by equation:

$$f = \frac{4\pi A}{U^2}$$

where A is a cross-sectional area of a channel and U is a circumference of a channel.

2. The filter element as recited in claim 1, wherein a cross section of the filter element is formed by joining a plurality of hexagonal unit cells, each of the unit cells is composed of equilateral triangles, each of the triangles is in mirror symmetry with neighboring triangles with respect to a common side of the triangle, in each triangle there are three filter walls, and each of the filter walls runs orthogonally to one side of the triangle.

3. The filter element as recited in claim 2, wherein a point of intersection of the filter walls is located inside the triangle.

4. The filter element as recited in claim 1, wherein a cross section of the filter element is formed by joining multiple hexagonal unit cells, each of the unit cells is composed of equilateral triangles, each of the triangles is in mirror symmetry with neighboring triangles with regard to a common side of the triangle, a central outlet channel is situated at a midpoint of each of the unit cells, the central outlet channel is surrounded by six inlet channels, and the inlet channels have a shape of a regular hexagon with three first sides and three second sides.

5. The filter element as recited in claim 4, wherein the first sides and the second sides of the inlet channels alternate with one another.

6. The filter element as recited in claim 4, wherein a ratio of lengths of the first sides and of the second sides is in a range from 0.3 to 1.5.

7. The filter element as recited in claim 6, wherein the range is from 0.6 to 0.75.

8. The filter element as recited in claim 4, wherein two neighboring sides of a hexagonal inlet channel form an angle of 60°.

9. The filter element as recited in claim 1, wherein a cross section of the filter element is formed by joining multiple hexagonal unit cells together, a central outlet channel is situated at a midpoint of each of the unit cells, a central outlet channel is surrounded by six inlet channels, the inlet channels have a shape of a polygon in mirror symmetry in cross section, and each of four inlet channels situated in proximity to one another surrounds an outer outlet channel.

10. The filter element as recited in claim 9, wherein the outer outlet channels have a cross-sectional form of a cube or a rhombus.

11. The filter element as recited in claim 4, wherein a central one of the outlet channels has a shape of an equilateral hexagon in cross section or is circular.

12. The filter element as recited in claim 4, wherein a basic structure of the filter element has a cell density of 200 cpsi (cells per square inch) to 450 cpsi.

13. The filter element as recited in claim 12, wherein the cell density is 300 to 350 cpsi.

14. The filter element as recited in claim 4, wherein a wall thickness of the filter walls is 0.1 mm to 1.2 mm.

15. The filter element as recited in claim 14, wherein the wall thickness is 0.25 mm to 0.50 mm.

16. The filter element as recited in claim 4, wherein the filter element is produced by extrusion.

17. The filter element as recited in claim 4, wherein the filter element is manufactured from a ceramic or a glass ceramic material.

18. The filter element as recited in claim 17, wherein the filter element is manufactured from one of cordierite, aluminum titanate or silicon carbide.

19. The filter element as recited in claim 4, wherein the filter element is manufactured from sintered metal.

20. The filter element as recited in claim 4, wherein the inlet channels begin at the inlet area and are sealed at the outlet area, and the outlet channels are sealed at the inlet area and end at the outlet area.

21. The filter element as recited in claim 4, wherein a porosity of a filter material is in a range between 30% and 70%, and an average pore size of the filter material is in a range between 5 micrometers and 30 *micrometers*.

22. The filter element as recited in claim 21, wherein an amount of pores whose diameter is at least twice as great as the average pore size is at most 30% of a volume of all pores.

23. The filter element as recited in claim 4, wherein a thermal capacity based on a total volume of the filter element is at least 400 Joules/liter Kelvin [J/LK].

24. The filter element as recited in claim 23, wherein the thermal capacity is between 500 J/LK and 750 J/LK.

25. A filter unit having a filter element, a housing and an exhaust pipe, the filter element comprising:
    an inlet area and an outlet area;
    a plurality of inlet channels;
    a plurality of outlet channels, the inlet channels and the outlet channels being separated by filter walls made of an open-pored material;
    wherein a cross-sectional area of all the inlet channels is larger than a cross-sectional area of all the outlet channels, a number of inlet channels is greater than a number of outlet channels, and a roundness parameter $f_{in}$ of the cross section of all the inlet channels is smaller than a roundness parameter $f_{out}$ of the cross section of all the outlet channels, roundness parameter f being defined by equation:

$$f = \frac{4\pi A}{U^2}$$

where A is a cross-sectional area of a channel and U is a circumference of a channel.

26. A filter element for filtering exhaust gases from a diesel internal combustion engine, comprising:
an inlet area and an outlet area;
a plurality of inlet channels;
a plurality of outlet channels, the inlet channels and the outlet channels being separated by filter walls made of an open-pored material;
wherein a cross-sectional area of all the inlet channels is larger than a cross-sectional area of all the outlet channels, a number of inlet channels is greater than a number of outlet channels, and a roundness parameter $f_{in}$ of the cross section of the inlet channels is smaller than a roundness parameter $f_{out}$ of the cross section of the outlet channels, roundness parameter f being defined by equation:

$$f = \frac{4\pi A}{U^2}$$

where A is a cross-sectional area of a channel and U is a circumference of a channel;
wherein a cross section of the filter element is formed by joining a plurality of hexagonal unit cells, each of the unit cells is composed of equilateral triangles, each of the triangles is in mirror symmetry with neighboring triangles with respect to a common side of the triangle, in each triangle there are three filter walls, and each of the filter walls runs orthogonally to one side of the triangle.

27. The filter element as recited in claim 26, wherein a point of intersection of the filter walls is located inside the triangle.

28. A filter element for filtering exhaust gases from a diesel internal combustion engine, comprising:
an inlet area and an outlet area;
a plurality of inlet channels;
a plurality of outlet channels, the inlet channels and the outlet channels being separated by filter walls made of an open-pored material;
wherein a cross-sectional area of all the inlet channels is larger than a cross-sectional area of all the outlet channels, a number of inlet channels is greater than a number of outlet channels, and a roundness parameter $f_{in}$ of the cross section of the inlet channels is smaller than a roundness parameter $f_{out}$ of the cross section of the outlet channels, roundness parameter f being defined by equation:

$$f = \frac{4\pi A}{U^2}$$

where A is a cross-sectional area of a channel and U is a circumference of a channel;
wherein a cross section of the filter element is formed by joining multiple hexagonal unit cells, each of the unit cells is composed of equilateral triangles, each of the triangles is in mirror symmetry with neighboring triangles with regard to a common side of the triangle, a central outlet channel is situated at a midpoint of each of the unit cells, the central outlet channel is surrounded by six inlet channels, and the inlet channels have a shape of a regular hexagon with three first sides and three second sides.

29. The filter element as recited in claim 28, wherein the first sides and the second sides of the inlet channels alternate with one another.

30. The filter element as recited in claim 28, wherein a ratio of lengths of the first sides and of the second sides is in a range from 0.3 to 1.5.

31. The filter element as recited in claim 30, wherein the range is from 0.6 to 0.75.

32. The filter element as recited in claim 28, wherein two neighboring sides of a hexagonal inlet channel form an angle of 60°.

33. The filter element as recited in claim 26, wherein the cross section of the filter element is formed by joining multiple hexagonal unit cells together, a central outlet channel is situated at a midpoint of each of the unit cells, the central outlet channel is surrounded by six inlet channels, the inlet channels have a shape of a polygon in mirror symmetry in cross section, and each of four inlet channels situated in proximity to one another surrounds an outer outlet channel.

34. The filter element as recited in claim 33, wherein the outer outlet channel has a cross-sectional form of a cube or a rhombus.

35. The filter element as recited in claim 28, wherein the central outlet channel has a shape of an equilateral hexagon in cross section or is circular.

36. The filter element as recited in claim 26, wherein a basic structure of the filter element has a cell density of 200 cpsi (cells per square inch) to 450 cpsi.

37. The filter element as recited in claim 36, wherein the cell density is 300 to 350 cpsi.

38. The filter element as recited in claim 26, wherein a wall thickness of the filter walls is 0.1 mm to 1.2 mm.

39. The filter element as recited in claim 38, wherein the wall thickness is 0.25 mm to 0.50 mm.

40. The filter element as recited in claim 26, wherein the filter element is produced by extrusion.

41. The filter element as recited in claim 26, wherein the filter element is manufactured from a ceramic or a glass ceramic material.

42. The filter element as recited in claim 41, wherein the filter element is manufactured from one of cordierite, aluminum titanate or silicon carbide.

43. The filter element as recited in claim 26, wherein the filter element is manufactured from sintered metal.

44. The filter element as recited in claim 26, wherein the inlet channels begin at the inlet area and are sealed at the outlet area, and the outlet channels are sealed at the inlet area and end at the outlet area.

45. The filter element as recited in claim 26, wherein a porosity of a filter material is in a range between 30% and 70%, and an average pore size of the filter material is in a range between 5 micrometers and 30 micrometers.

46. The filter element as recited in claim 45, wherein an amount of pores whose diameter is at least twice as great as the average pore size is at most 30% of a volume of all pores.

47. The filter element as recited in claim 26, wherein a thermal capacity based on a total volume of the filter element is at least 400 Joules/liter Kelvin [J/LK].

48. The filter element as recited in claim 47, wherein the thermal capacity is between 500 J/LK and 560 J/LK.

49. A filter unit having a filter element, a housing and an exhaust pipe, the filter element comprising:
- an inlet area and an outlet area;
- a plurality of inlet channels;
- a plurality of outlet channels, the inlet channels and the outlet channels being separated by filter walls made of an open-pored material;
- wherein a cross-sectional area of all the inlet channels is larger than a cross-sectional area of all the outlet channels, a number of inlet channels is greater than a number of outlet channels, and a roundness parameter $f_{in}$ of the cross section of the inlet channels is smaller than a roundness parameter $f_{out}$ of the cross section of the outlet channels, roundness parameter f being defined by equation:

$$f = \frac{4\pi A}{U^2}$$

where A is a cross-sectional area of a channel and U is a circumference of a channel;
wherein a cross section of the filter element is formed by joining a plurality of hexagonal unit cells, each of the unit cells is composed of equilateral triangles, each of the triangles is in mirror symmetry with neighboring triangles with respect to a common side of the triangle, in each triangle there are three filter walls, and each of the filter walls runs orthogonally to one side of the triangle.

* * * * *